H. O. RUGH.
SIGNALING SYSTEM.
APPLICATION FILED MAR. 27, 1909.
1,002,181.
Patented Aug. 29, 1911.
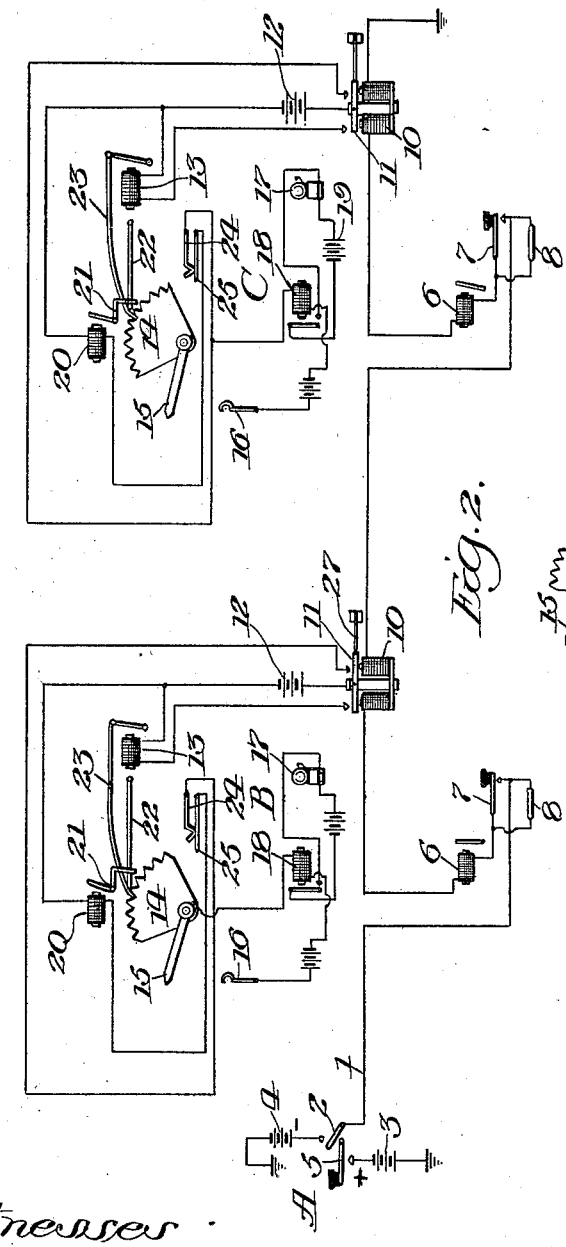
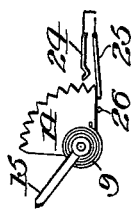
Witnesses
Inventor
Harry O. Rugh
by Max W. Zabel
Atty

UNITED STATES PATENT OFFICE.

HARRY O. RUGH, OF SANDWICH, ILLINOIS, ASSIGNOR TO SANDWICH ELECTRIC COMPANY, OF SANDWICH, ILLINOIS, A CORPORATION OF ILLINOIS.

SIGNALING SYSTEM.

1,002,181.  Specification of Letters Patent.  Patented Aug. 29, 1911.

Original application filed June 26, 1908, Serial No. 440,570. Divided and this application filed March 27, 1909. Serial No. 486,120.

*To all whom it may concern:*

Be it known that I, HARRY O. RUGH, citizen of the United States, residing at Sandwich, in the county of Dekalb and State of Illinois, have invented a certain new and useful Improvement in Signaling Systems, of which the following is a full, clear, concise, and exact description, reference being had to the accompanying drawings, forming a part of this specification.

My invention relates to signaling systems, and has for its object the provision of an improved selector system which is applicable more particularly in the operation of railway telegraph and signaling circuits.

The advantages of my invention will be more particularly set forth in connection with the embodiment thereof shown in the accompanying drawings, in connection with which I will now describe my invention.

Figure 1 shows my system diagrammatically, and Fig. 2 shows a detail of the selector mechanism.

I have for the purposes of illustration shown three stations A, B, C,—A being the sending station, and B and C the receiving stations. A line wire 1 unites all of the stations, ending at station A in a switch 2, adapted for connecting said line wire 1 with either of the batteries 3 or 4, so that either positive or negative battery impulses may be projected over said line wire 1 to ground. The other end of said line wire 1 is likewise grounded. A key 5 is provided to send positive battery impulses over the line wire 1 when the switch 2 is in its proper position, the normal position of the switch 2 being to connect the line wire 1 to negative battery 4. A telegraph relay 6 is connected with its associate key 7, and the short circuit key 8 is inserted in the line wire 1 at the various stations B, C, whose number may be increased, of course, if desired. The switch 2 is normally in such position that for telegraphic purposes negative battery current is permanently connected to the left hand end of line wire 1. When key 5 is depressed, however, battery impulses can be sent over the line wire 1, as clearly indicated. The key 5 is used for calling the various stations B and C independently of the telegraph instruments, and calling of these stations is accomplished by sending positive battery impulses over said line wire 1, which positive impulses pass through the relay 10, which actuates its floating armature in such a way as to send impulses from the battery 12 through the relay 13, which relay, therefore, actuates the step-by-step mechanism 14 until it is in such position that the arm 15 makes contact with the spring 16, thus to signal the bell 17 through the agency of the time relay 18 and battery 19. The arm 15, of course, is placed relatively to the member 14 in a position depending upon the particular station which it is desired to call, having different angular positions, so that various positions of the step-by-step mechanism will call the various stations selectively.

The above features are claimed in this application, and the system with which the above devices are used (which are also set forth hereinafter) are set forth and claimed in my co-pending application, Serial No. 440,570, filed June 26, 1908, of which this is a divisional application and which issued on July 13, 1909, as Patent #927,602.

The action of the time relay 18 prevents a mere passing contact of the arm 15 with the spring 16 from actuating the bell 17. Thus each of the stations B and C may be called from the station A by depressing the key 5. After the bell has sounded, at the particular station desired, switch 2 is released, and negative battery current again flows through line wire 1. This actuates the polarized relay 10 in the opposite direction, so that current flows from battery 12, through the relay 20, so that by means of the arm 21, the actuating levers 22 and 23 are released to allow the step-by-step mechanism 14 to fall back into its normal position. When it thus falls back into its normal position, it thereby opens the circuit through springs 24, 25, as shown in Fig. 2, thereby opening the circuit through the relay 20. It is very important when the step-by-step mechanism falls back into its normal position, to prevent a continuous actuation of the armature 21, on account of the negative battery impulses which would be flowing over the line whenever the telegraph key 7 of either station is actuated. The relay 20 and its armature 21 thus constitutes what might be called "restorer controlling means." The release magnet 20 being cut out, however, through the agency of the step-by-step mechanism 14, and the springs 24 and 25, battery impulses may be sent over line wire 1, through the key 7, and not cause any action of the relay 20, even if the polarized relay 10 responds to these negative impulses. A coiled spring 9 restores the selector mechanism 14 to its normal position, when the magnet 20 operates. A stop 26 is provided, so that the selector mechanism 14 will stop after it has opened circuit through springs 24 and 25. If the circuit were not opened through springs 24 and 25, it is apparent that an actuation of the telegraph key 7, in sending negative battery impulses over the line, would continually operate the magnet 20 through operation of the polarized relay 10. By means of my improved relay, with its floating armature, which is adapted to make connection in two different manners, I am enabled to cause two different kinds of operation of the selector mechanism, thus to cause said selector mechanism to be moved to its operative position, and also to have said selector mechanism released, my single relay with its unit armature accomplishing this result.

While I have herein shown and particularly described the embodiment of my invention, I do not wish to limit myself to the precise construction and arrangement as herein shown, but what I claim as new and desire to secure by Letters Patent is:

1. A system of the character described having a central station and a plurality of substations united by a line circuit, a polarized relay at each substation having operating coils, a floating armature for each relay normally held away from both of its limiting positions, two contacts normally out of engagement with the floating armature, a current impulse of a given polarity through said coils serving to attract said armature in a given direction to close circuit through one of its contacts, an impulse of opposite polarity through said coils serving to close circuit through the other contact, means at the central station for sending said impulses, a selector mechanism at each substation under the control of its associated relay, whereby one operation of said relays serves to step up all of said selector mechanisms, and the other operation of said relays serving to restore all of said selector mechanisms to normal in unison, magnets interposed between said polarized relay and said selector mechanism, electric circuits for said magnets including the relay contacts aforesaid, and means under the control of the selector mechanism for controlling the circuit through one of said magnets aforesaid.

2. A system of the character described having a central station and substations, united by a line circuit, a polarized relay having two operating coils at each substation, a floating armature for each relay, normally held away from both of its limiting positions, two contacts for each armature normally out of engagement with the floating armature, a current impulse of a given polarity through said coils serving to attract said armature in a given direction to close circuit through one of said contacts, an impulse of opposite polarity through said coils serving to close circuit through the other contact, a selector mechanism under the control of each relay, whereby one operation of said relays serves to step up all of said selector mechanisms and a further operation of said relays serves to restore all of said selector mechanisms to normal in unison, magnets interposed between said polarized relay and said selector mechanism, electric circuits for said magnets including the relay contacts aforesaid, a local battery for operating said last mentioned magnets, and means under the control of each selector mechanism for controlling the circuit through one of its associated magnets aforesaid.

In witness whereof, I hereunto subscribe my name this 10th day of March, A. D., 1909.

HARRY O. RUGH.

Witnesses:
E. PARSONS,
E. C. HENNIS.

---

Copies of this patent may be obtained for five cents each, by addressing the "Commissioner of Patents, Washington, D. C."